Nov. 20, 1962    G. BONNET ETAL    3,064,967
PROCESS OF OPERATION OF AND WINDOW FOR A HIGH-ACTIVITY CELL
Filed Aug. 16, 1960    3 Sheets-Sheet 1

Nov. 20, 1962  G. BONNET ETAL  3,064,967
PROCESS OF OPERATION OF AND WINDOW FOR A HIGH-ACTIVITY CELL
Filed Aug. 16, 1960  3 Sheets-Sheet 3

3,064,967
PROCESS OF OPERATION OF AND WINDOW
FOR A HIGH-ACTIVITY CELL
Georges Bonnet, Grenoble, and Jean Petit, Villejuif,
France, assignors to Commissariat a l'Energie Atomique, Paris, France
Filed Aug. 16, 1960, Ser. No. 49,958
Claims priority, application France Sept. 3, 1959
8 Claims. (Cl. 268—115)

The invention relates to a process for limiting the opacification of a window for a high-activity cell and the like.

Operations on radioactive materials take place in special cells known as "high-activity cells," the walls of which constitute a strong protection against radiations. The operations are conducted by means of remote controls, remote manipulators and so on and the problem of observation can be solved either by the use of a periscope or by the use of television or by windows of large thickness.

The latter solution of windows of large thickness is utilised most often as it is the most practical. These windows should satisfy essentially two conditions: on the one hand, they should ensure satisfactory luminous transmission and, on the other hand, they should constitute an efficient protection. It is known to make windows corresponding with these conditions for example by using an aqueous solution of zinc bromide in a glazed frame, or also by forming assemblies of blocks of glass. In the latter case, to ensure a protection equivalent to that of the walls of the cell without appreciably increasing the thckness of the window, lead glasses are used. These glasses constitute a good protection, but gamma radiations have the effect of discolouring them and thus of opacifying them. This opacification can be partially remedied by the addition of a stabiliser, for example cerium ions. The property of such glasses of having a certain capacity for auto-regeneration of their optical characteristics can also be exploited.

The process of the invention is characterised in that it takes advantage of this property of auto-regeneration of the optical qualities of the glass by alternate exposure of one and the other face of a block of glass to the zone of maximum radiation intensity, the adjacent less exposed layers of the face undergoing regeneration in a manner sufficient to recover their initial properties.

The window of the invention is essentially characterised in that it comprises a slab of glass disposed in front of an aperture in the wall of the cell in a framework provided with two spindles located in two supports carried on a carriage displaceable normally of the wall, and a roller engaging in a slide connected to the wall, a translatory movement of the carriage moving away from and then approaching the wall and then causing pivoting of the slab around the axis of the spindles under the action of the roller guided by the slide, the slab being returned to its original position in front of the aperture after rotation through 180°.

According to other characteristics of the invention, the frame carrying the slab of glass is provided with a two-position counterweight acting so as to aid pivoting movement of the slab in the case of pivoting around a horizontal axis. On the other hand, the carriage undergoes displacement on roller tracks provided on the wall of the high-activity cell outside periods of use of the slab, these roller tracks, in the position of use, also allowing the carriage and the slab to disengage from the wall with a view to raising the slab. In one embodiment, which will be described below in detail, the axis of pivotation of the slab is horizontal. In another embodiment, the axis of pivotation is vertical. In all cases, the essential characteristic of the invention is the successive exposure, at given intervals of time, of the two faces of a slab of glass to maximum radiation, the non-exposed face thus being able to undergo regeneration and recovering its optical properties.

Other characteristics and advantages of the invention appear from the following description and the accompanying drawings, in which.

The invention is based on the fact that, for given glasses used to make windows of high-activity cells and exposed to gamma radiation of the radioactive material contained in the cells, there is a threshold of intensity of radiation below which the glass does not discolour and even regenerates itself, and above which the browning is cumulative. The gamma radiation passing through the glass undergoes an attenuation governed by the law:

$$I = I_o . e^{-\mu x}$$

where $I$ is the radiation in a region situated inside the glass, $I_o$ is the incident radiation, $\mu$ is the absorption factor, which depends upon the density of the glass and the energy of the gamma radiations, and $x$ is the distance of the region considered from the face exposed to the incident radiation. This formula, which allows the thickness of the glass necessary for the protection to be calculated, shows that the decrease in intensity of the radiation through the glass is exponential.

If the intensity of the radiation $I_o$ is higher than the browning threshold mentioned above, it appears necessary to change the glass periodically. Such a change must necessarily be effected in certain cases for cells where $I_o$ is of the order of $10^7$ roentgens/h., the browning threshold in those cases being lower than this value. But as the sheets of glass used currently have a weight of the order of a ton and a high cost, the disadvantages of such an operation can be readily appreciated. It thus appears more economical and simpler to use a device permitting the glass to "recover" in situ.

According to the invention, different layers of the glass are located in zones where alternatively they receive radiation respectively higher and lower than the intensity $I_s$, namely the discolouration threshold, in such a manner that neither of the layers receives, during an interval of time $t$, an integral dose higher than $$\int_0^t I_s . dt.$$

This is effected according to the invention by constituting the internal part of the window by a slab of glass which can pivot about a horizontal or vertical axis to present successively to the zone of intense radiation one or other of its faces, the face not directly exposed and the adjacent layers receiving an attenuated radiation permitting them to undergo regeneration. The dimensions of the pivoting slab of glass are thus easily determined by a person skilled in the art. Several practical devices can be envisaged to effect pivoting of the slab. The accompanying drawings show one embodiment by way of non-limitative example.

Figure 1:
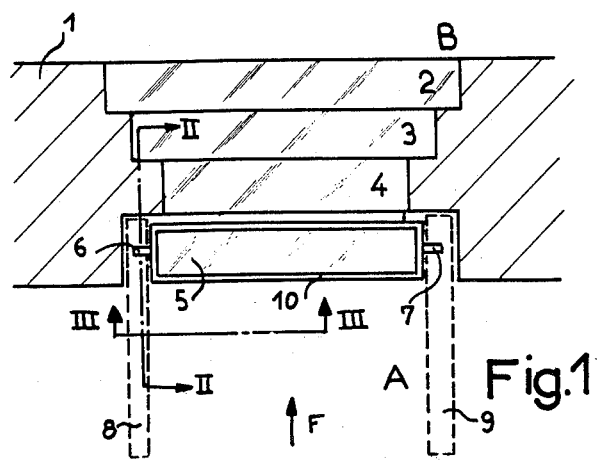
FIG. 1 shows diagrammatically the window of the invention.

FIG. 1 shows a wall 1 of concrete of a high-activity cell pierced by a window which comprises a certain number of fixed slabs of glass, such as 2, 3 and 4. Sealing of the cell is effected around these fixed slabs. The radiation emanating from the interior of the cell has a general sense indicated by the arrow *f*. It impinges directly on a slab 5 fixed in a frame 10 provided for example with two spindles 6 and 7 with a horizontal axis. The frame is supported by the spindles on a carriage, not shown in FIG. 1, which can be displaced, during pivoting of the slab 5, on retractable roller trackways 8 and 9.

Figure 2:
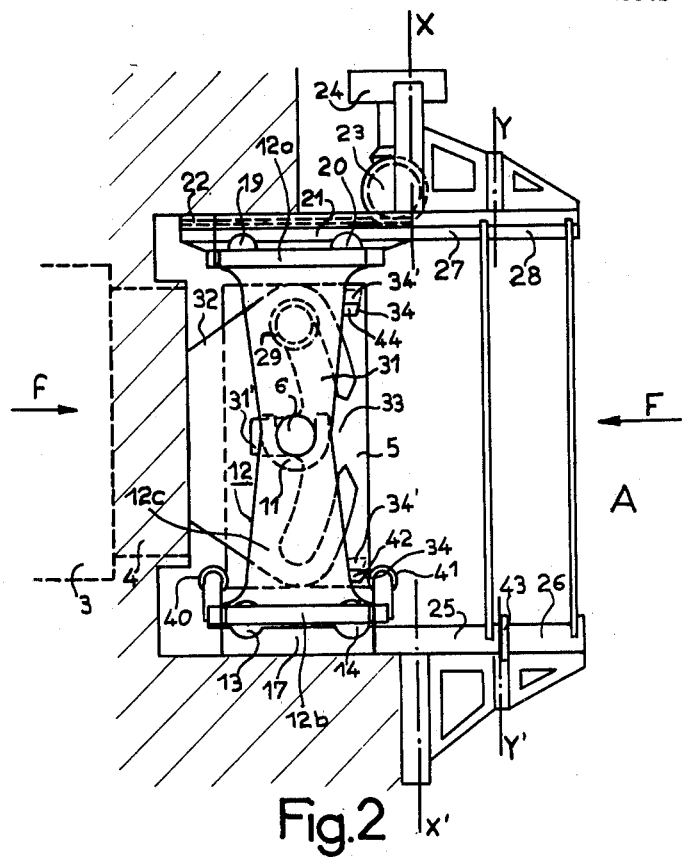
FIG. 2 is a lateral elevational view of the pivoting device for the slab of glass according to one embodiment of the invention, corresponding to section II—II of FIG. 1.
Figure 3:
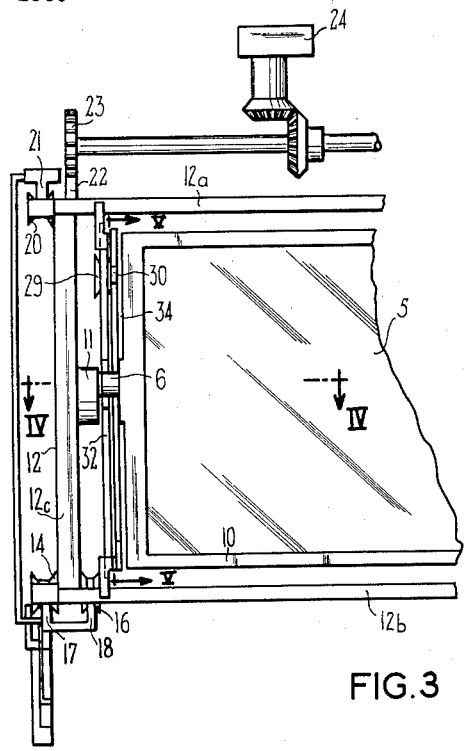
FIG. 3 is a partial view of the device according to the arrow F of FIG. 2, corresponding to the section III—III of FIG. 1.
Figure 4:
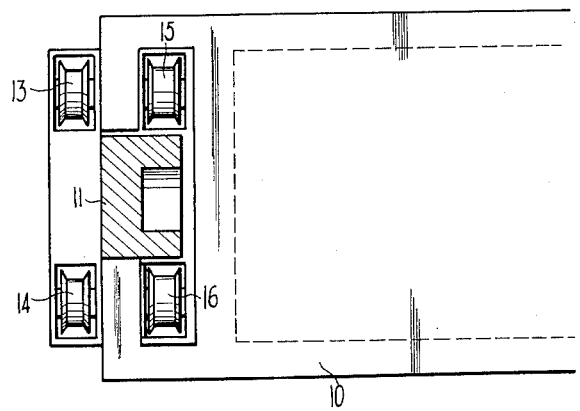
FIG. 4 is a view in partial section of the carriage along the line IV—IV of FIG. 3.

FIG. 2 shows in lateral elevation the device for pivoting the glass slab 5. FIG. 3 represents a partial view as seen in the direction of the arrow F of FIG. 2. The slab is fixed in the frame 10 and can pivot about a medium horizontal axis, due to the two spindles 6 and 7 (of which only one, indicated at 6, is shown in FIGS. 2 and 3) connected to the frame. The spindles are located in two open supports (of which one is represented at 11) connected to a carriage 12 formed by two horizontal rectangular plates 12a and 12b connected by vertical plates 12c. The carriage 12 is provided with rollers, such as 13, 14, 15 and 16, carried on roller trackways such as 17 and 18 normal to the wall of the cell. At its upper part, the carriage 12 is provided with guiding rollers, such as 19 and 20, resting on roller trackways, such as 21, to avoid any tilting of the carriage. It also carries a gear rack 22 engaging a toothed wheel 23, driven either by a motor 24, which is electric or of any other appropriate type, or by the operator through the intermediary of a suitable transmission, for example shafts and pinions.

The roller trackways such as 17 and 21 are provided respectively with parts 25 and 26, 27 and 28 which are foldable out of the way about axes XX' and YY' into a position laterally disencumbering the field of vision of the window. Fixing and control of these parts of the roller trackways are effected in any usual manner.

The frame 10 is provided with a roller 29 which is carried by a spindle 30 and can undergo displacement in a slot 31, for example having the shape of an arc of a circle, provided in a slide 32, which is a flat member in the form of a circular sector. This slide is fixed in the wall of the cell and has, apart from the slot 31, a horizontal slot 31' located on its axis of symmetry and open at 33 to the interior A of the cell. The spindle 6 moves into and out of the slot 31' as the carriage 12 is reciprocated along the trackways 17 and 18.

Figure 5:
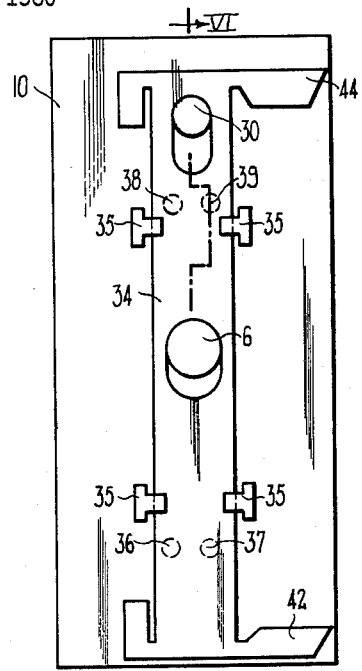
FIG. 5 is a partial sectional view along the line V—V of FIG. 3.
Figure 6:
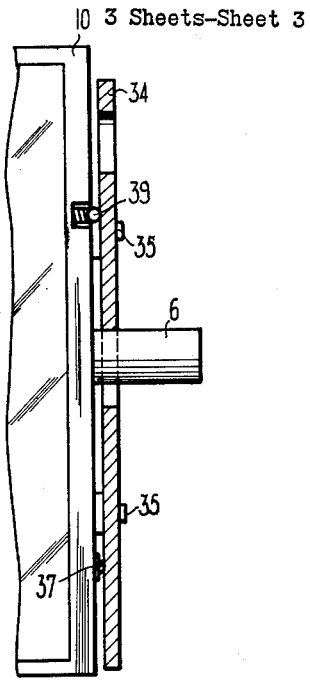
FIG. 6 is a view in section along the line VI—VI of FIG. 5.

On the frame 10 is fixed a two-position counterweight 34. This counterweight, of flat shape, is shown in detail in FIGS. 5 and 6. It is shown in FIG. 2 in the low position at 34; the high position is shown by dotted lines in the same FIGURE at 34'. This counterweight is maintained by four guides 35, FIGS. 5 and 6, which allow it to slide freely between the two extreme positions 34 and 34'. It remains in its high position, FIGS. 5 and 6, when it does not receive any external thrust, due for example to two ball catches 36 and 37; its low position is determined by two other ball catches 38 and 39.

Figure 7:
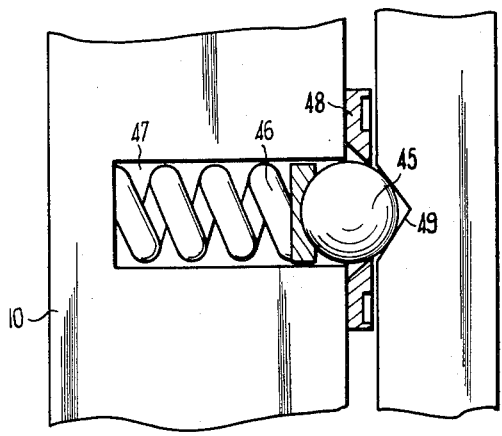
FIG. 7 is a view on a larger scale of a detail of FIG. 6.

FIG. 7 shows in detail the constitution of one of these ball catches 38 or 39, which consists essentially, in known manner, of a ball 45 and a spring 46 located in a well 47 in the frame, a retaining plate 48 and an aperture 49 in the counterweight 34; the position of the counterweight is determined, as described above, by two rollers 40 and 41 connected to the carriage 12.

Operation of the pivoting device is as follows:

The sections 26 and 28 of the roller trackway are turned inwardly; the counterweight 34 is in the high position 34' and the roller 29 in the position shown in FIG. 2. The motor 24 is then operated to displace the carriage 12 towards the interior A of the cell, that is to say towards the right in FIG. 2. As the travel of the roller 29 is determined by the slide 32, the frame 10 commences rotation in an anticlockwise sense about the axis of the spindle 6. If the counterweight is in the low position 34 at the start, FIG. 2 and FIG. 5, a lug 42 on the counterweight contacts the roller 41 which locates it in the high position 34' where it is held by the ball catch devices 36 and 37. This position gives to the upper half of the slab-frame assembly a weight slightly greater than that of the lower half, which aids the movement of rotation. The movement of the carriage 12 proceeds to an abutment 43 (FIG. 2) carried by the hingeable section 26 of the roller track 17. The frame and the slab pass through the horizontal position, the roller 29 then no longer being guided by the slide 32 because of the gap 33 in the slot 31'. Through a system of relays and limiter switches, the motor 24 then returns the carriage 12 to the left, that is to say, toward the "operative" position of the cell in its location and the rotation of the frame 10 continues in the same sense. When a lug 44 passes over the roller 40, the latter changes the position of the counterweight 34 returning it to the position 34; this position corresponds to the high position of the counterweight relative to the new position of the slab 5; the counterweight 34 is then ready for the subsequent pivoting maneuvre. After the end of the maneuvre, the projecting sections of the roller trackways are folded back.

When it is necessary to remove or replace the slab 5, the retractable section such as 25, 26, 27 and 28 of the roller trackways are put forward, as shown in FIG. 2, and the carriage runs to the end of its travel. The roller 29 disengages the slide 32 through the gap 33, the section 26 forming an extension of the section 25 when the front of the carriage passes the abutment 43 which is retracted. The slab resumes a vertical position under the action of the counterweight 34. To remove the slab of glass from the carriage, it is sufficient to lift it by means of a pulley-block. This device also permits replacement of the slab without removing the carriage from its rails; with the pivot spindles for the new slab resting on the supports, the combined action of the pulley-block and the counterweight allows the slab to be put into the horizontal position and then the roller 29 to be returned to its slide.

In the above, there is described a device for pivoting about a horizontal axis, but a device in which pivoting is effected about a vertical axis can also be used; the plane of the slide is then horizontal and the curved slot thereof is then described by a roller carried by the upper part of the frame of the slab. Return of the slab 5 may also be effected by raising it by means of appropriate remote control lifting tackle.

The invention is consequently not limited to the construction described and shown, which has been given merely by way of example.

We claim:

1. A process for limiting the opacification of a glass slab subjected to radiation in a high-activity cell and the like, comprising the steps of providing a slab of sufficient thickness for lowering the radiation level under the opacification threshold, exposing one of the two opposed faces of said slab to the direct radiation of said cell until the layers adjacent to the other of said faces have regained their optical qualities, revolving said slab through 180° for exposing said other face to the direct radiation of said cell, and maintaining said slab in the latter orientation until the layers adjacent said one face have regained their optical properties.

2. In a high-activity cell and the like having a wall and a window aperture in said wall: a window assembly comprising a glass slab, a frame carrying said slab, spindle means on said frame, roller means on said frame, a carriage arranged for reciprocating movement normal to said wall, support means for said spindle means formed on said carriage, and stationary guiding means slidably receiving said roller means for movement of said roller means transverse to the direction of reciprocation of said carriage, whereby a complete reciprocation of said carriage results in a 180° rotation of said frame and slab about said spindle means.

3. A window assembly as set forth in claim 2, wherein said spindle means are horizontal and located in the midplane of the slab and frame assembly.

4. A window assembly as set forth in claim 2, including a counterweight, means providing a lost motion connection between said counterweight and said frame, first yieldable locking means for maintaining said counterweight in a first of its extreme positions with respect to said frame, second yieldable locking means for maintaining said counterweight in the second of its extreme positions with respect to said frame, and control means for moving said counterweight from one of said extreme positions in which the center of gravity of said counterweight is located on one side of said spindle means into the other of its extreme positions in which the center of gravity of said counterweight is located on the other side of said spindle means responsive to initial rotation of said frame and slab assembly, whereby said counterweight exerts a torque cooperating with said guiding means and roller means to rotate said frame and slab assembly.

5. A window assembly as set forth in claim 4, wherein said control means comprise first actuating means in fixed relation with said counterweight and second actuating means in fixed relation with said carriage, said second actuating means being so located in the path of said first actuating means as to move said counterweight from said one into said other of its extreme positions upon rotation of said frame and slab assembly.

6. A window assembly according to claim 2, wherein said spindle means are vertical and located in the midplane of said slab-frame assembly.

7. A window assembly as set forth in claim 2, including stationary rails perpendicular to said wall and rollers carried by said carriage and rolling on said rails, said rails having foldable terminal portions.

8. A window assembly as set forth in claim 7, including retractable abutment means carried by said terminal portions, said abutment means being so constructed as to be inoperative when said terminal portions are unfolded.

References Cited in the file of this patent

UNITED STATES PATENTS

| | | |
|---|---|---|
| 1,839,554 | Heiman | Jan. 5, 1932 |
| 2,957,210 | Levenson | Oct. 25, 1960 |

FOREIGN PATENTS

| | | |
|---|---|---|
| 555,085 | Belgium | Aug. 16, 1957 |